No. 888,348.

PATENTED MAY 19, 1908.

A. B. NICHOLS.
CULTIVATOR FENDER.
APPLICATION FILED AUG. 12, 1907.

WITNESSES

INVENTOR
ATHERTON B. NICHOLS
BY
HIS ATTORNEYS

UNITED STATES PATENT OFFICE.

ATHERTON B. NICHOLS, OF HASTINGS, MINNESOTA.

CULTIVATOR-FENDER.

No. 888,348.  Specification of Letters Patent.  Patented May 19, 1908.

Application filed August 12, 1907. Serial No. 388,081.

*To all whom it may concern:*

Be it known that I, ATHERTON B. NICHOLS, of Hastings, Dakota county, Minnesota, have invented certain new and useful Improvements in Cultivator-Fenders, of which the following is a specification.

The object of my invention is to provide an attachment for a cultivator which will act as a fender to guard the corn or other plant that is being cultivated, and protect it from being covered or crushed by the soil that is stirred up and thrown toward the plant by the action of the cultivator teeth.

My invention consists generally in a revolving guard having a series of teeth supported at an angle to the soil and adapted to revolve through contact therewith, said teeth operating close to the plant on each side of the row and forming a fender therefor.

Figure 1:
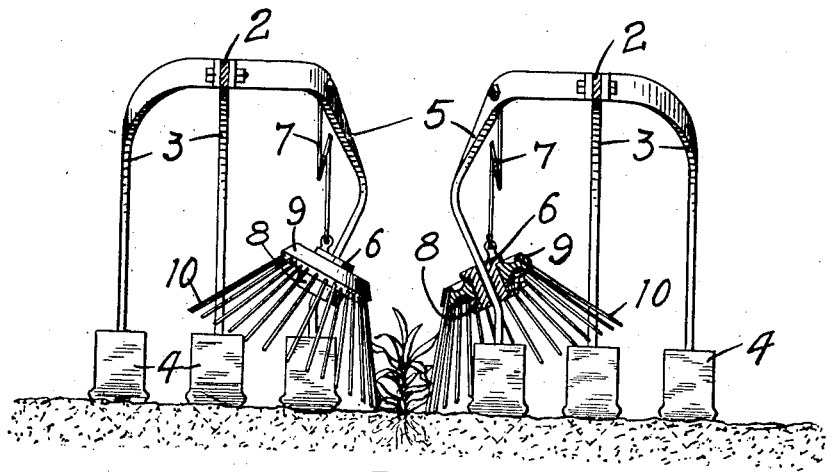
Figure 2:
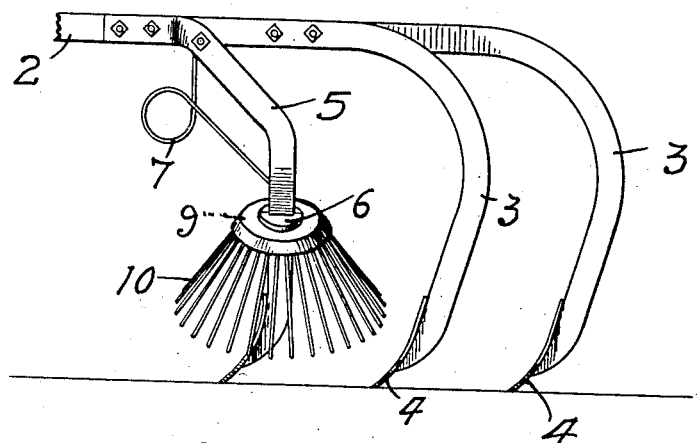

In the accompanying drawings, forming part of this specification, Figure 1 is a sectional view of a portion of a cultivator with my invention applied thereto. Fig. 2 is a side elevation of the same.

In the drawing, 2 represents the cultivator drag bar having depending shanks 3 on which the teeth 4 are mounted. The opposite sections of the cultivator are provided on their inner sides next to the row that is being cultivated with shanks 5 which are inwardly and outwardly turned above the point where the cultivator teeth are attached, as shown in Fig. 1. Upon these shanks hubs 6 are slidably mounted and springs 7 are connected with said hubs and tend to lift upwardly thereon and cause the teeth of the revolving wheels to bear lightly on the surface of the ground. The hubs are made in two parts having collars 8 at their lower ends and rings or wheels 9 are loosely mounted on said hubs above said collars and adapted to revolve thereon, and a series of spring teeth 10 are mounted in said wheels and extend downwardly and outwardly therefrom and revolve with the said wheels in planes at an angle to the horizontal so that the ends of the teeth on one side only will touch the soil as the wheels revolve. The forward motion of the cultivator will produce a rotating movement of the wheels on their hubs and the sliding action of the hubs will allow them to move up and down on the shanks and accommodate themselves to the inequalities of the ground over which the cultivator is moving. The teeth mounted on the shanks 5 will operate below and within the circle of the revolving wheels and the teeth extending downwardly between the cultivator teeth and the plants will act as fenders or guards and sift the soil that is turned up by the cultivator teeth and prevent it from being piled over upon or against the plants. Any clods of earth or stones loosened by the cultivator teeth will be prevented by the fender teeth from breaking or damaging the plants.

There may be any suitable number of the fender teeth mounted in the rings or wheels 9 and these teeth may be of any degree of stiffness desired to produce the best results. The fenders are arranged on each side of the row of plants and rolling on the surface of the ground at an angle to the horizontal will cover the weeds around the plant and at the same time support the plants during the cultivating operation.

As indicated in the drawing, the fenders are inclined and have the effect of raising the leaves or stalks of the plant sufficiently to allow the soil to be directed under them and protecting the leaves or stalks and preventing them from being broken down by the weight of pressure of the soil.

I claim as my invention:

1. The combination, with a cultivator having a series of teeth and shanks inclined to the horizontal whereon said teeth are supported, of fenders having a rotary and a vertical movement on the inclined portions of said shanks and provided with a series of teeth that are adapted to roll on the ground on each side of the plant that is being cultivated, said teeth operating between the cultivator teeth and the plant and preventing the plant from being broken or covered by the soil loosened by the cultivator teeth.

2. The combination, with a cultivator having a series of teeth, of a fender arranged to revolve in a plane inclined to the horizontal and comprising a hub and a series of teeth flaring downwardly and outwardly therefrom, said fender being adapted to revolve on its support and the teeth thereof contacting on the inner side only of the fender with the soil, the teeth on the opposite side being out of contact with the soil and said inner teeth serving as guards between the plants and the cultivator teeth to prevent clods of earth from being thrown against the plants.

3. The combination, with a cultivator, of a fender or guard mounted thereon and having a revolving movement in a plane inclined to the horizontal, a series of teeth carried by said fender and depending between the cultivator teeth and the plant to be cultivated, said fender being revolved by the contact of its teeth with the soil and having a sliding vertical movement on its support to allow the fender to accommodate itself to inequalities of the surface over which the cultivator is moved.

4. The combination, with a cultivator having a series of teeth, of a fender comprising a hub, a ring mounted thereon and adapted to revolve in a plane at an angle to the horizontal said hub having a vertical movement on its support, a series of teeth mounted in said ring and depending between the cultivator teeth and the plant to be cultivated, said fender teeth contacting on one side only with the soil and rotated with their supporting ring by such contact and said teeth guarding the plant and preventing it from being broken or covered by the soil loosened by the cultivator teeth.

5. The combination, with a cultivator having a series of teeth and shanks whereon said teeth are mounted, of hubs carried by said shanks and having a sliding vertical movement thereon, and a series of peripheral teeth carried by said hub and having their ends arranged to contact with the ground and be revolved thereby and said teeth extending down between the cultivator teeth and the plant and serving as a guard or fender for the plant.

6. The combination, with a cultivator drag bars and the teeth mounted thereon, and shanks depending from said drag bars, of hubs slidably mounted on said shanks, springs connecting said hubs with said shanks and a series of teeth carried by said hubs and depending therefrom and flaring downwardly and outwardly in a circular form, said hub being arranged at an angle to the horizontal, whereby the teeth on one side will contact with the soil and on the other side be raised out of contact with the soil, and said hub being capable of revolution through contact of the teeth with the soil.

7. The combination, with a cultivator having a series of teeth arranged to operate on both sides of a row of plants, of fenders arranged to revolve in planes at an angle to the horizontal on both sides of a row of plants, each fender comprising a hub and a series of teeth flaring downwardly and outwardly therefrom in a circular form, said fenders being adapted to revolve on their supports and the teeth thereof contacting on the inner side of the fender with the soil, the teeth on the opposite side being out of contact with the soil and said inner teeth serving as guards between the plants and the cultivator teeth to prevent clods of earth from being thrown against the plants, substantially as described.

8. In a cultivator, the combination, with a depending shank having an inclined lower portion, of a hub slidably mounted on said inclined portion and supported thereby at an angle to the horizontal, a series of teeth radiating from the under side of said hub and flaring downwardly and outwardly therefrom, the teeth on the inner side only of said hub contacting with the soil, and serving as guards or fenders between the cultivator teeth and the plants, substantially as described.

In witness whereof, I have hereunto set my hand this 3d day of August 1907.

ATHERTON B. NICHOLS.

Witnesses:
RICHARD PAUL,
J. B. BYMGTON.